May 13, 1958  H. MILLER  2,834,563
AIRCRAFT AUTOMATIC PILOT
Filed Nov. 30, 1954  2 Sheets-Sheet 1
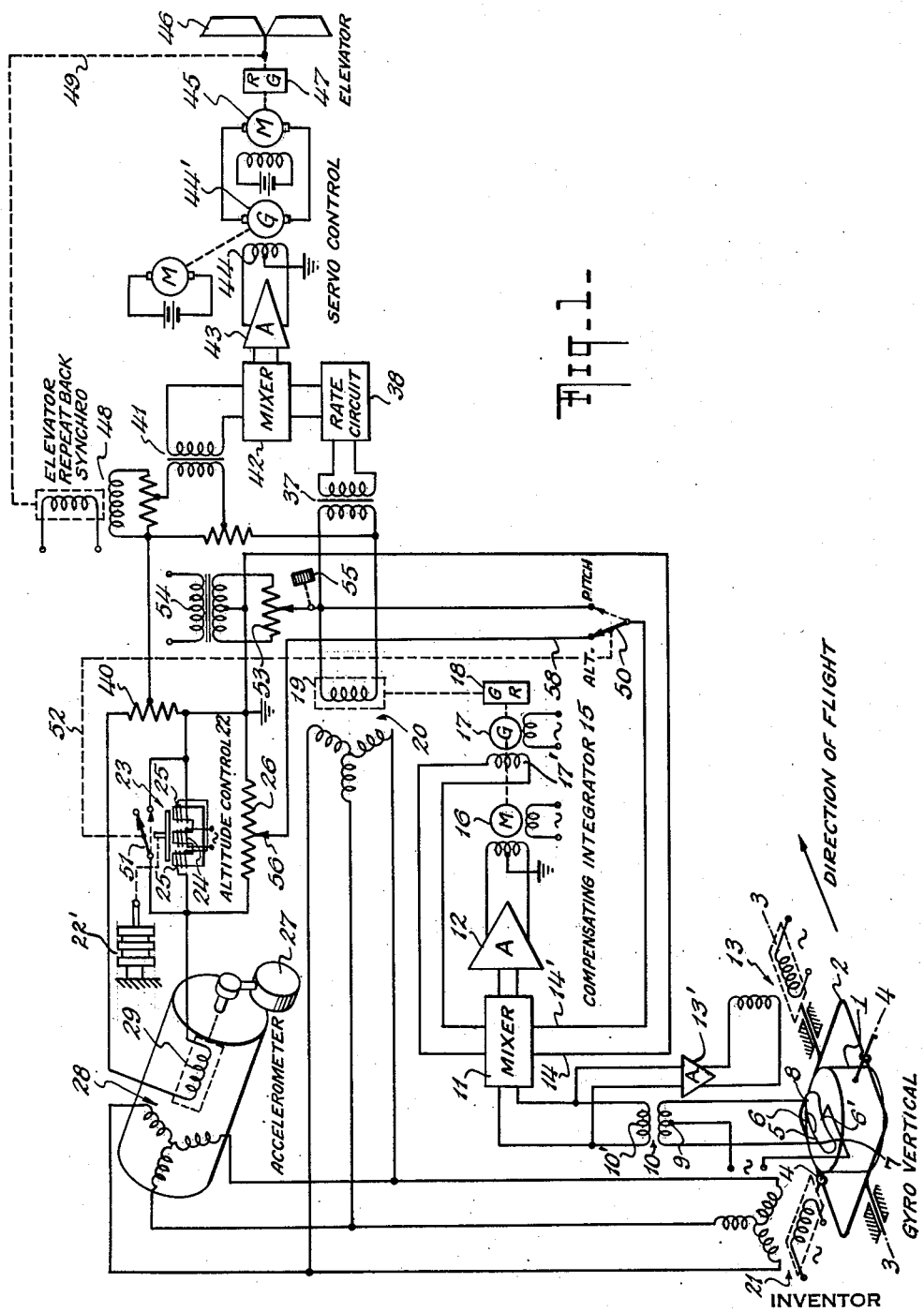
INVENTOR
HARRY MILLER
BY
Herbert H. Thompson
his ATTORNEY

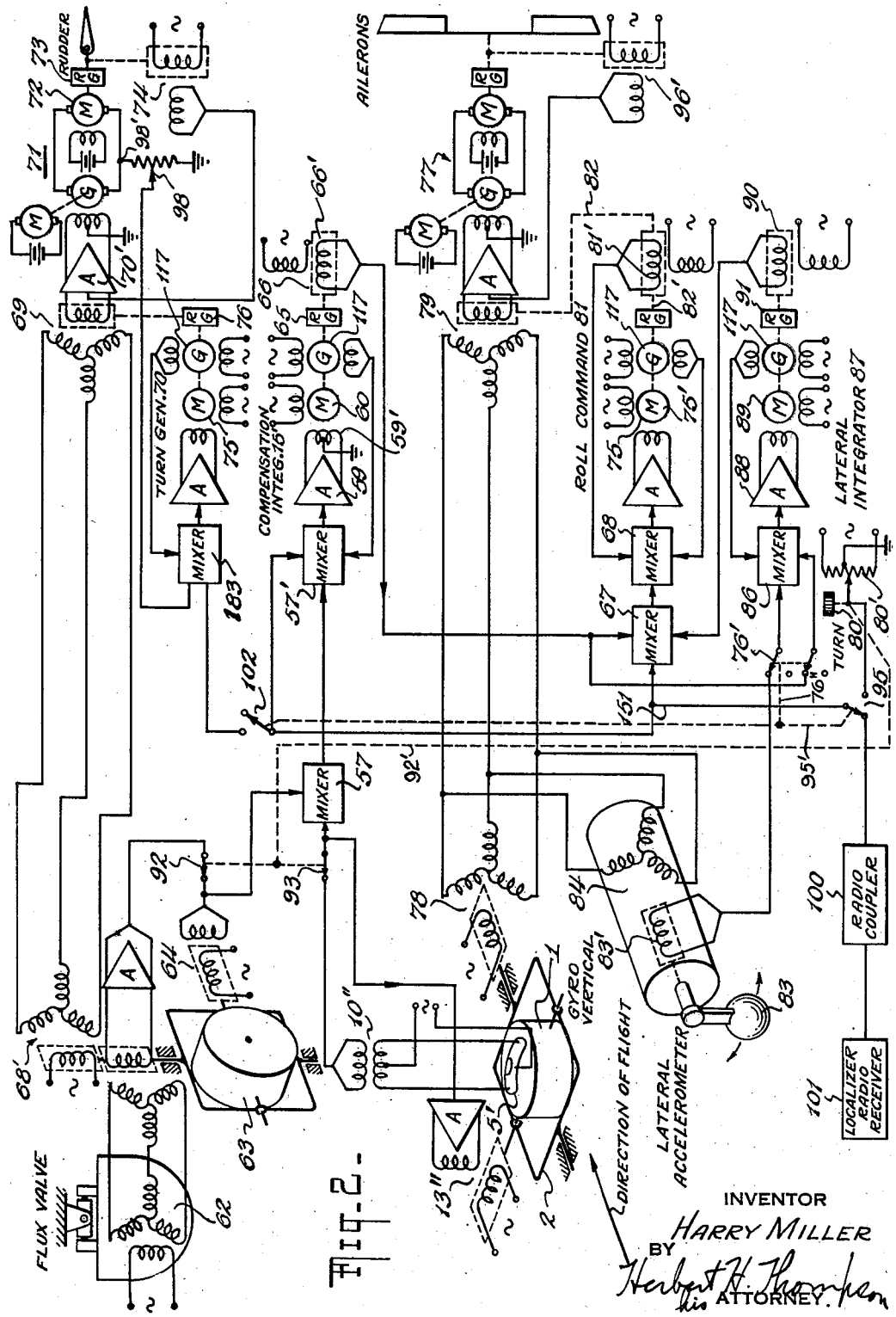

United States Patent Office 2,834,563
Patented May 13, 1958

2,834,563

AIRCRAFT AUTOMATIC PILOT

Harry Miller, Brooklyn, N. Y., assignor to Sperry Rand Corporation, a corporation of Delaware Application November 30, 1954, Serial No. 471,991

14 Claims. (Cl. 244—77)

This invention relates to navigational apparatus for aircraft of the kind in which gyroscopic apparatus determines the reference direction or plane relative to which the attitude of the aircraft about an axis is determined so that departure of the aircraft from the predetermined attitude or orientation about that axis is detected and a signal produced proportional thereto. The gyroscopic apparatus may be a gyro vertical provided with pick-off devices producing signals proportional to the departure of the craft respectively in pitch and roll from the horizontal, and/or a directional gyroscope for producing a signal proportional to the departure of the attitude of the craft in azimuth (or heading) from its predetermined attitude or heading. These signals may be used either for complete automatic control of the craft as by an automatic pilot or for operation of a visual indicator of the null or zero reading type for directing a pilot as to how he shall operate the airplane control surfaces.

The particular problems under which the present invention is directed were found to arise in high speed aircraft when following a radio guidance system in azimuth or elevation, or when maintaining a constant altiude by an altimeter. There has been noted in such aircraft a tendency to hunt or oscillate particularly about the pitch axis of the craft in following a landing beam, and similar tendencies have also been noted about the yaw and roll axes when following a localizer beam or other radio guidance system. I have found that one hitherto unappreciated cause of such oscillations, or of the poor damping of such oscillations, is a phenomenon occurring by virtue of the fact that the reference gyroscopes with reference to which the aircraft is controlled are usually under the control of monitoring devices which are subject to lateral acceleration forces. Thus, a gyro vertical is normally controlled by pitch responsive and roll responsive pendulums or liquid levels, or by other tilt detecting devices, associated with the gyroscope. Similarly the azimuth gyroscope used in aircraft is normally controlled by some device responsive to the earth's magnetic field which may for present purposes be termed a magnetic compass. It is thus usually said that the directional gyroscope is slaved to a magnetic compass and the gyro vertical to gravity. In normal straight flight these monitoring devices by means of a slow, or long term, monitoring control prevent wander of the gyroscopes from some reference direction or plane that is maintained by the gyroscope. In particular the gravity responsive pitch and roll detectors operate on the occurrence of error in gyro position about the pitch and roll axes of the craft to apply control torques to the gyroscope to eliminate the roll or pitch error. Similarly, the magnetic compass unit operates on the occurrence of wander of the azimuth gyroscope from its reference position in azimuth to prevent such wander.

When the aircraft undergoes an acceleration of any type, the monitoring devices are usually affected, and exercise unwanted control torques on the gyroscopes. It has been found that these control torques produce errors in the gyroscopes which, though small, may cause hunting of the aircraft about its desired course. Whether the gyroscope is used to provide a control signal for automatic control, or for an indicating instrument by reference to which the pilot controls the aircraft, the effect is that the attitude of the aircraft is changed to follow the error produced in the gyroscope by the aircraft's acceleration. The resulting inclination, or turn, of the aircraft brings into play changes in the magnitude, or direction, or aerodynamic lift, of the aircraft, and this changes the attitude and acceleration of the aircraft. It has been found that this cycle of events—acceleration affecting the gyroscopes, the gyroscopes affecting the attitude of the aircraft, and the attitude of the aircraft affecting the acceleration—has an unstabilizing or hunt provoking tendency. This is one cause of hunting oscillations, or poor damping of oscillation, of the aircraft with respect to its radio course, the radio error signals operating as a long term supervisor.

Another cause for pitch instability has been found to be due to the fact that the barometric controller which governs the long term height of the craft is affected by the angle of attack of the aircraft. The dynamic effect of the angle of attack on the static pressure source of the aircraft may be observed when the pitch attitude of the aircraft is caused to change rapidly, and the most serious disturbance is caused when the effect has a negative gradient, that is, when the nose is pulled up to give an increased angle of attack, the change in static pressure causes the altimeter to show an instantaneous pressure increase and vice versa.

An object of the present invention is to eliminate or reduce the above-described causes of instability in the control of an aircraft.

According to one feature of the invention errors of the reference gyroscopic instruments due to the action of accelerations on the monitoring devices are compensated for by compensating means, which, while allowing the errors of the gyroscope to take place, provide a compensating effect in the signal for the automatic pilot or navigational indicator provided by the gyroscopic instrument.

The compensating means may be designed and arranged to respond in substantially the same manner to the control signal from the monitoring device as the gyroscope responds in developing its error, so that the compensating effect in the system is substantially equal and opposite to the error of the gyroscope. Generally a monitoring device is arranged to apply a torque to the gyroscope in response to the error signal provided by the monitoring device. This torque causes precession of the gyroscope at a rate proportional to the torque, so that the error produced in the gyroscope is the time integral of the control signal provided by the monitoring device. Likewise the compensating means is caused to produce an output signal which also is the time integral of the control signal provided by the monitoring device and this integrated signal is fed as a correction into the final signal which controls the attitude of the craft through the automatic pilot or visual indicator.

In a still further improvement according to the invention the compensating means produces a compensating quantity that is substantially equal to the time integral of the input quantity applied to it only for intervals of time of the order of a period of oscillation of the aircraft, but does not continue to integrate indefinitely the input signals applied to it since the long period supervision is effected by the radio control system or altimeter.

In order to correct for the effects described above of barometric instability it is proposed to use in addition to the integrated signal above referred to another signal secured from an accelerometer responsive to forward acceleration to compensate or correct the signal generated by the altimeter or rate of climb controller and to feed this combined signal also into the pitch control servo. It is also desirable to use a portion of a continuing altitude error signal to maintain the proper attitude to keep the aircraft at the altitude called for in the altimeter.

To correct transient errors in roll and heading of an automatically piloted aircraft, I employ means somewhat similar to those employed to correct the transient pitch errors, but the correction of these errors is complicated by the interrelation between roll and heading. In other words, roll of the aircraft usually causes a turn, and a coordinated turn of the aircraft must be accompanied by a bank. Also turns of the craft not only give rise to centrifugal acceleration forces (another form of lateral acceleration) which not only cause an error in the gyro vertical, but also an error in a directional gyroscope slaved to a magnetic compass for the reason that a turn causes the magnetic compass to tilt and thus introduce a vertical component of the earth's field. While I am aware that gyro errors due to turns have in the past been largely prevented by severing the gyro vertical erection system from the gravitational controller during turns, and also by simultaneously severing the slaving control from the magnetic compass of the slaved directional gyroscope, such remedies do not take care of the small, course correcting turns that take place in following, for instance, directional or localizer radio beams or omnirange beams, since it is impractical to sever the gravitational and magnetic controls during this time because of frequently recurring turns, because if such controls are severed frequently, the magnetic and gravitational references would be lost and the gyroscopes subject to wander. Upon investigation I have found ground track oscillations to be due in part to the error in the gyro vertical caused by lateral accelerations during the slight turns in following the radio beam, which is also true to some extent with the pitch control in following a glide path beam.

I, therefore, employ not only my integrated correction system in connection with the gyro vertical and aileron servo as hereinbefore described in connection with the gyro vertical and elevator system, but also employ such an integrating system in connection with the compass-slaved directional gyro and introduce both as a correction into the aileron servo system. To this extent, this invention is somewhat similar to my prior joint invention with George F. Jude, Serial No. 465,332, filed October 28, 1954, for Aircraft Automatic Pilots.

I further find it necessary to employ an inertial device to derive cross-course velocity information for damping ground track oscillations when the control system is used for lateral radio guidance as on localizer and omnirange radio beams, and I have found such system superior to the prior art system of using rate of change of radio information for this purpose. Said vertical device may be a pendulum pivoted fore-and-aft on the craft and hence subject to this type of lateral acceleration. The output of the pendulum is mixed with the output of the compensation integrator to supply a correction to the aileron servo system.

Referring to the drawings, Fig. 1 is a diagrammatic view showing an elemental wiring diagram of my invention as applied to the elevator control system of an automatic pilot. Fig. 2 is a similar view of my invention as applied to the rudder and aileron control systems of an automatic pilot which usually employs the same gyro vertical for supplying attitude information for both the roll and pitch axes but with a separate gravitational control device for each axis.

The gyro vertical 1 which controls the attitude of the craft is shown as mounted in gimbal ring 2 to provide freedom about fore-and-aft major axis 3—3 and lateral minor axis 4—4. The gyro spin axis is maintained vertical by means of two gravitational devices, one 5 placed fore-and-aft on the gyro and the other 5' (Fig. 2) placed athwartship. Each liquid level is nearly filled with a conducting liquid except for air bubble 6. Control electrode 6' leads A. C. into the bottom of the level. The relative resistance to current flow through the electrolyte to the spaced upper pick-off electrodes 7 and 8 will vary with the position of the bubble 6. Electrodes 7 and 8 are shown connected to the opposite ends of the primary winding of transformer 10 while the A. C. supply is connected between its center tap 9 and electrode 6'.

The position of the bubble in the liquid level is, of course, affected not only by the forward inclination of the gyro but also by forward acceleration of the craft. The output of the secondary winding 10' of said transformer hence varies in polarity and amount with the departure of the bubble from its central position, said output being applied through amplifier 13' to torquer 13 which applies a torque about the roll axis of the gyro to cause it to be erected in pitch, as well understood in the art.

Since, however, the position of the bubble is adversely affected by forward acceleration, the position of the gyro becomes increasingly erroneous during forward accelerator, and to compensate for such error, I integrate a portion of the error causing signal as detected by the liquid level and apply it to the pitch control system of the craft to oppose or correct for the error of the gyro due to such cause. As shown, I introduce a portion of the signal from the secondary 10' of transformer 10 through the mixer 11 where it is combined with the pitch trim voltage entering through leads 14 and 14' and the combined signal is then amplified and integrated in the compensating integrator 15. This is shown as consisting of a motor 16 which drives the speed or tachometer generator 17 and reduction gear train 18 which slowly turns one winding 19 of the selsyn control transformer 20 coupled back-to-back with the pitch pick-off selsyn transmitter 21 on the pitch axis of the gyro vertical. The purpose of the tachometer 17 is to accurately proportion the speed of the motor 16 to the strength of the signal from amplifier 12 and to damp its rotation. The output of the generator induced in winding 17' varies in polarity and magnitude with the direction of rotation and speed thereof and is fed back into mixer 11. By such or equivalent means, the signal from the liquid level is integrated over a period on the order of the phugoid motion of the craft to give a signal proportional to the total deviation of the gyro from the vertical during this period, which deviation is in effect also an integral of the output of the liquid level. By feeding this signal or factor into the elevator control system with the proper polarity, the deviation of the gyro caused by forward acceleration is prevented from adversely affecting the attitude of the craft. The signal, therefore, appearing in the control transformer in winding 19 not only varies with the error in the attitude of the plane with respect to the gyro but also is corrected for the error in the gyro itself, as detected by the liquid level and calculated by the pitch integrator.

In the diagram the altitude control is shown as primarily secured from an altimeter controller 22 which may be of the form shown in my prior joint application with Robert D. Love, now Patent No. 2,729,780 for Altitude Control for Automatic Pilots, dated January 3, 1956. The barometer is shown diagrammatically in the form of an aneroid bellows 22' connected to an E form of pick-off. The E pick-off unit 23 of the altimeter is shown in the drawing as comprising a primary winding 24 on the center leg of the E pick-off and the secondary or output windings 25 on the outer legs, across which is shown a variable resistor 26. Since the altimeter is usually adversely affected by angle of attack effects on the static pressure source, as explained above, I propose to correct for this adverse effect by using a forward accelerometer represented by a pendulum 27, the axis of which is placed athwartship of the craft. This pendulum has connected thereto a selsyn transformer 28 or signal generator placed back-to-back with the selsyn transmitter 21 on the pitch axis of the gyro so that a signal will be produced in the output winding 29 of said transformer which varies with the error in vertical position between the gyro vertical and the pendulum and which, therefore, is an approximate measure of forward acceleration. It is to be understood that other forms of forward accelerometers may be used, such for instance as disclosed in my U. S. Letters Patent No. 2,770,452, issued November 13, 1956, for A System for Measuring the Acceleration of Dirigible Craft.

The signal from the E transformer 23 on the altimeter is algebraically added to the signal from the winding 29 of the accelerometer and a portion of the corrected signal appearing across resistor 40 is supplied to displacement transformer 41 which feeds into the mixer 42. Said mixer is also supplied with the pitch error signal appearing in winding 19 of selsyn 20 through transformer 37 and a rate taking network 38. The signal supplied to the mixer 42 is preferably also supplemented by a repeatback signal from the elevator repeatback synchro transformer 48 which is driven by the motor 45 as represented by the dotted line 49.

The output of mixer 42 controls the servo control unit through amplifier 43. This unit is shown as of the Ward-Leonard type in which the output of amplifier 43 controls the direction and strength of the field 44 of continuously driven generator 44', the output of which governs the direction and speed of the servomotor proper 45 driving the elevators 46 through reduction gear box 47.

It is the usual practice to only use the altimeter control during level and cross-country flight and to disconnect the same if flying on a radio guided path such as a radio glide path beam. For this purpose I have shown two switches 50 and 51, preferably ganged together as represented by the dotted line 52. In the position shown, a portion of the signal from the altimeter 22 is fed back into the mixer 11 through leads 14, 14'. Unless such a correction is introduced into the mixer 11, normal drift of the gyro vertical due to earth's rate, friction and so forth would appear in the integrator and cause an error in the pitch controls. This error would result in loss or increase in the preset altitude of the craft which would be detected by the altimeter. Therefore, in the altimeter mode of operation, a portion of the output of the altimeter is fed back into the mixer through a tap 56 on resistor 26 through lead 58, switch 50 and return lead 14'.

In the other mode of operation with the switch 50 in the dotted line position, this error may be corrected for by the human pilot by adjusting the pitch trim knob 55 when the pilot notices that the aircraft is losing or gaining altitude or not following the desired glide path. In the dotted line position, the switch 51 short-circuits the output of the altimeter and the switch 50 transfers the feedback to the mixer 11 from the altimeter output to the pitch trim voltage secured from the variable tapped potentiometer 53 supplied from the transformer 54. The pitch trim may be varied either manually or through a radio receiver for the glide path beam, this being merely represented in the drawing by the knob 55.

Referring now to Fig. 2 illustrating the roll and heading controls of an automatic pilot system, it is observed that the gravitational controller 5' on the gyro is placed athwartship on the gyro 1. The tilt error detected by the liquid level 5' is used as in Fig. 1 for the dual purpose of erecting the gyroscope by means of the torquer 13" and for supplying a signal through transformer 10" to a compensating integrator 15' through the mixers 57 and 57'. Similarly the error signal between the flux valve or magnetic compass 62 not only supplies a slaving torque to the slaved gyro 63 through torquer 64, but is also fed into the mixer 57 so that a portion of this signal is likewise integrated in compensating integrator 15', this system being hence similar to the error correction system shown in my aforesaid prior joint application with George F. Jude. The compensating integrator is shown as comprising an amplifier 59 supplied from the mixer 57' and which excites in one direction or the other one winding 59' of the motor 60 which drives through reduction gearing 65 one winding 66' of a synchro transformer 66. The output of said winding is supplied to the mixer 67 to ultimately form the course compensating control to correct for gyro vertical errors due to lateral acceleration and which through roll command or follow-up amplifier 81 is fed into the aileron servomotor system 77.

It is to be understood that the rudder is controlled in the usual manner from the slave gyroscope 63 through selsyn transmitter 68' on the gyroscope and selsyn transformer 69, one winding of which may be adjusted from the output of the turn rate control system 70, the output of which is fed into amplifier 70' of the rudder servo system 71.

Both the aileron and rudder servo systems 77 and 71 are shown as of the Ward-Leonard type in which the motor 72 (of the former, for instance) drives the rudder through reduction gearing 73. A follow-back synchro 74 is shown which feeds rudder position back into the amplifier 70'. For preventing sideslip, a feedback tap 98' is taken from the supply line between the generator and motor of the system, a portion of which signal is fed back from tapped resistor 98 into the mixer 183 of the turn rate generator system 70. The motor 75 of this system turns through reduction gearing 76, the rotatable winding of the selsyn transformer 69.

The aileron servo system 77 is shown as controlled primarily from a pair of selsyns 78, 79 connected back-to-back, the pick-off selsyn 78 being on the roll axis of the attitude gyro and the selsyn transformer receiver 79 at the aileron controls. The output of selsyn 79 controls a Ward-Leonard type aileron servo unit 77 which may be similar to the rudder unit with a follow-back synchro 96'. In case of command turns, as from turn knob 80 on potentiometer 80', there is also fed into the mixer 67 a portion of the command signal but this signal may not be used during radio navigation, at which time switch 95 is opened. When a turn or roll is commanded as through knob 80, the rotor of selsyn transformer 79 is slowly rotated from a roll command or roll followup amplifier unit 81 as indicated by the dotted line 82 connecting 79 and the output shaft 82' of motor 75' of the roll command unit 81. This roll command follow-up unit may be of similar structure and function to that described in the copending application of Everett R. Tribken and Marvin J. Match, Serial No. 419,978 for Aircraft Control System, filed March 31, 1954, to which reference is had for details. By it the airplane is caused to slowly bank until the commanded bank angle matches the actual bank angle as measured by the attitude gyro selsyn 78. This is accomplished by feeding back the output of the synchro 81' driven from motor 75' into the mixer 68 to which the roll command signal is supplied through switch 95, lead 151 and mixer 67.

When the device is in the radio homing mode of operation, signals from the radio receiver 101 and coupler 100 are supplied through the mixers 67 and 68 to the roll command unit 81, thus causing the airplane to bank and hence turn into the corrected heading. At the same time a portion of the signal is also supplied to the mixer 57' connected to the compensation integrator 15' by which a continuing course by adjusting the ailerons error signal corrects the course.

As above explained, to damp ground track oscillations about the desired radio course, I employ a lateral accelerometer 83 which may be in the form of a pendulum pivoted about a fore-and-aft axis on the craft. Connected to said pendulum is a selsyn transformer 84 connected back-to-back with selsyn pick-off 78 on the attitude gyro, so that a signal will be produced in the winding 83' connected to the pendulum whenever the position of the pendulum and gyro in the vertical differ which occurs in the presence of cross-heading accelerations. This signal is transmitted through switch 76' and mixer 86 to the lateral integrator 87 which integrates the relative movements of the pendulum and gyro to give a measure of the craft's cross course velocity. Switch 76' may be opened when the radio mode of operation is not being used and, therefore, switches 95, 102 and 76' may be ganged together as represented by the dotted lines 95' and 76". The lateral integrator is shown as comprising an amplifier 88 controlling the motor 89 which drives the tachometer generator 117 and the synchro transformer 90 through reduction gearing 91 with a speed proportional to the strength of the original signal and hence displacing it through a total angle representing the time integral of cross course acceleration, i. e., cross course velocity. The output of the synchro transformer 90 is fed into the aforesaid mixer 67 of the roll command unit to damp the approach of the craft to the radio ground track and also avoid cross wind error.

The output of the winding 66' of synchro 66 of the compensation integrator 15' is also supplied to the mixer 67 to secure coordinated turns, a portion of which may also be supplied to the mixer 86 of the lateral integrator. When steering from the radio localizer 101, the several switches are all in the full line position and it is noted that in this position the directional gyro and attitude gyro respectively remain slaved to the flux valve and liquid level, but during command turns the switches 92 and 93 are preferably opened to cut off the slaving to both gyros. This is represented by dotted line 92' connecting turn knob 80 and switches 92 and 93. Also during the radio mode of operation the switch 102 ganged to switch 95 is open so that the small course changes for keeping on the radio beam are transmitted only to the aileron servo, but command turns affect both rudder and aileron channels, at which time switches 95 and 102 are in the opposite positions from that shown in the drawings.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus, while I have illustrated my invention as applied to the correction of the signals controlling the servomotors of an automatic pilot, it is likewise applicable to the correction of the signals controlling a navigational indicator for the human pilot which operates from similar signals on the zero reading or null principle. Such a zero reading system is shown in the patent to Kellogg, No. 2,613,352 for Radio Navigation System, dated October 7, 1952.

What is claimed is:

1. A correction device for automatic pilots having a servo system for controlling the attitude of the craft, including a gyro vertical, a gravitational device thereon, means for generating a signal upon error between said gravitational device and gyro vertical, means for exerting an erecting torque on said gyro vertical controlled from said signal to erect the gyro, means for also integrating a portion of said signal, and means for feeding said integrated signal as a corrective factor into the servo system for correcting the attitude of the aircraft to compensate for error in the gyro vertical due to acceleration forces 2. A navigational system for aircraft automatic pilots having a servo controlling the pitch attitude of aircraft, including a gyro vertical, a gravitational device thereon, means for generating a signal upon pitch error between said gravitational device and gyro vertical, means for exerting an erecting torque on said gyro vertical controlled from said signal to erect the gyro, means for also integrating a portion of said signal, and means for feeding said integrated signal as a corrective factor into the pitch system of said automatic pilot.

3. A navigational system for aircraft automatic pilots having a servo controlling the roll attitude of aircraft, a gyro vertical, a gravitational device, means for generating a signal upon error in roll between said gravitational device and gyro vertical, means for exerting an erecting torque on said gyro vertical controlled from said signal to erect the gyro in roll, means for also integrating a portion of said signal, and means for feeding said integrated signal as a corrective factor into the roll system of said aircraft to compensate for error in the gyro vertical due to lateral acceleration forces.

4. A correction device for automatic pilots having a servo system for controlling the attitude of the craft, including a gyro vertical, a gravitational device thereon, means for generating a signal upon error between said gravitational device and gyro vertical, means for exerting an erecting torque on said gyro vertical controlled from said signal to erect the gyro, means for also integrating a portion of said signal, means for feeding said integrated signal as a corrective factor into the servo system for correcting the attitude of the aircraft to compensate for error in the gyro vertical due to acceleration forces, a signal generating accelerometer, and means for feeding a function of said signal into said integrating means.

5. A correction device for automatic pilots having a servo system controlling the pitch attitude of aircraft, including a gyro vertical, a gravitational device thereon, means for generating a signal upon pitch error between said gravitational device and gyro vertical, means for exerting an erecting torque on said gyro vertical controlled from said signal to erect the gyro, means for also integrating a portion of said signal, means for feeding said integrated signal as a corrective factor into the pitch servo system of said automatic pilot, a signal generating forward accelerometer, and means for feeding a function of said signal into said integrating means.

6. A navigational system for aircraft automatic pilots having a servo controlling the pitch attitude of aircraft, including an altimeter having a signal generator associated therewith, a gyro vertical, a gravitational device associated therewith, means for generating a signal upon pitch error between said gravitational device and gyro vertical, means for exerting an erecting torque on said gyro vertical controlled from said signal to erect the gyro, means for also integrating a portion of said signal, means for feeding said integrated signal as a corrective factor into the pitch system of said automatic pilot, and means for feeding said signal from said altimeter into said integrating means.

7. A correction device for navigational aids as claimed in claim 6, also having an accelerometer responsive to the forward acceleration of the craft, a signal generator therefor, and means for combining said altimeter signal and accelerometer signal to correct for errors in the latter due to pitching of the craft.

8. A correction device for automatic pilots having a servo system controlling the roll attitude of aircraft, a gyro vertical, a gravitational device, means for generating a signal upon error in roll between said gravitational device and gyro vertical, means for exerting an erecting torque on said gyro vertical controlled from said signal to erect the gyro in roll, means for also integrating a portion of said signal, means for feeding said integrated signal as a corrective factor into the roll servo system in said automatic pilot to compensate for error in the gyro vertical due to lateral acceleration forces, a signal generating lateral accelerometer, and means for integrating said signal and feeding it into the roll system.

9. A correction device for automatic pilots having a servo system controlling the roll attitude and course of the aircraft, including a gyro vertical, a gravitational device, means for generating a signal upon error in roll between said gravitational device and gyro vertical, means for exerting an erecting torque on said gyro vertical controlled from said signal to erect the gyro in roll, means for also integrating a portion of said signal, means for feeding said integrated signal as a corrective factor into the roll servo system in said automatic pilot to compensate for error in the gyro vertical due to cross-course velocity, and means for damping hunting of the craft in correcting deviations from course including means for producing a signal proportional to cross-course velocity and introducing said signal into said servo system.

10. A correction device for radio guided automatic pilots having a servo system controlling the roll attitude and hence turning of the aircraft, a gyro vertical, a gravitational device associated therewith, means for generating a signal upon error in roll between said device and gyro vertical, means for exerting an erecting torque on said gyro vertical controlled from said signal to erect the gyro in roll, means for introducing corrections into the roll servo system for damping or suppressing hunting about the radio course including means for integrating a portion of said first error signal, a signal generating lateral accelerometer, means for integrating the signal therefrom, and means for feeding both said integrated signals into the roll system to suppress hunting of the craft about the radio defined track.

11. In an automatic pilot for aircraft adapted for radio path guidance, a servomotor for moving the ailerons, a lateral accelerometer, means for integrating the output thereof to produce a signal proportional to said integrated output, means producing a signal proportional to the displacement of the craft from its radio path, and means for controlling said aileron servo from the algebraic sum of said two signals to keep and damp the craft on its radio defined path.

12. In an automatic pilot susceptible of radio path and manual guidance, servomotors for moving the rudder and ailerons, manual means producing a signal commanding a turn, a lateral accelerometer, means for integrating the output thereof to produce a signal, means producing a signal upon displacement of the craft with respect to its radio path, means for controlling said aileron servo from the algebraic sum of said integrated and radio displacement signals to keep and damp the craft on its radio defined path, and alternative means for controlling both said servos from said command signal, said signal being introduced into the controls for both said servomotors.

13. In an automatic pilot for aircraft adapted for radio path guidance, and having an attitude maintaining instrument and a radio guidance receiver, a servomotor for moving the ailerons, a lateral accelerometer, means for integrating the output thereof to produce a signal, means producing a signal upon displacement of the craft with respect to its radio path, means producing a signal upon error between said instrument and the craft's bank attitude, and means for controlling said aileron servo from a mixture of said three signals to keep and damp the craft on its radio defined path.

14. In an automatic pilot susceptible of radio path and manual guidance, and having attitude maintaining instruments and a radio guidance receiver, servomotors for moving the rudder and ailerons, manual means producing a signal commanding a turn, a lateral accelerometer, means for integrating the output thereof to produce a signal, means producing a signal upon displacement of the craft with respect to its radio path, means producing signals upon error between the craft's attitude in azimuth and bank from that maintained by said instruments, means for controlling said aileron servo from a mixture of said integrated radio displacement and attitude signals to keep and damp the craft on its radio defined path, and alternative means for controlling both said servos from a mixture of said command and error signals, said mixed signals being introduced into the controls for both said servomotors.

References Cited in the file of this patent

UNITED STATES PATENTS

| | | |
|---|---|---|
| 2,270,875 | Hanson et al. | Jan. 27, 1942 |
| 2,450,907 | Newton et al. | Oct. 12, 1948 |
| 2,620,463 | Meredith | Dec. 2, 1952 |
| 2,627,384 | Esval | Feb. 3, 1953 |
| 2,649,264 | Slater et al. | Aug. 18, 1953 |